Nov. 6, 1923.
T. SHAW
BELT FASTENER
Filed May 9, 1922
1,472,890
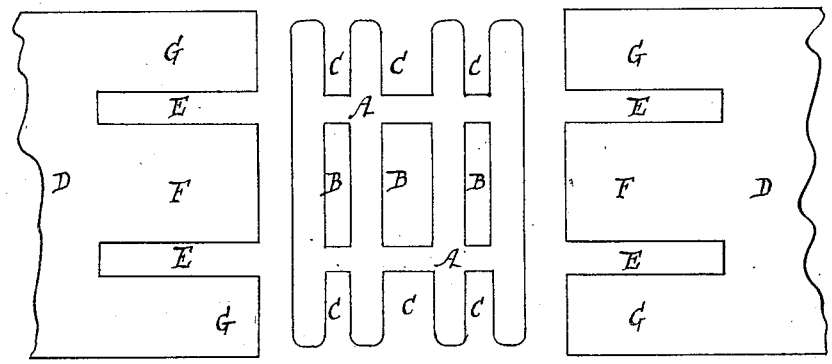
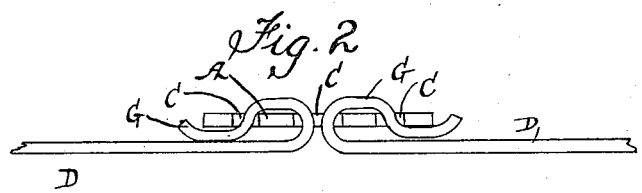
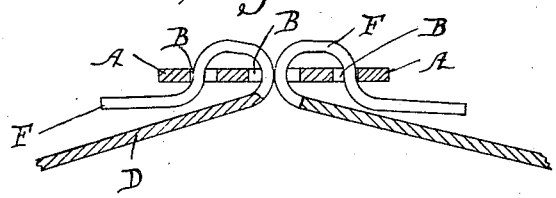

Patented Nov. 6, 1923.

1,472,890

UNITED STATES PATENT OFFICE.

THOMAS SHAW, OF MATANGI, WAIKATO, NEW ZEALAND.

BELT FASTENER.

Application filed May 9, 1922. Serial No. 559,657.

*To all whom it may concern:*

Be it known that I, THOMAS SHAW, subject of the King of Great Britain, residing at Matangi, Waikato, New Zealand, have invented new and useful Improvements in Belt Fasteners, of which the following is a specification.

This invention has been devised with the object of providing a simple and cheap form of fastener by means of which the two ends of machinery belting, or other like articles used in analogous circumstances, may be connected together in a quick, secure and generally efficient manner. The fastener designed also provides that a smooth running surface will be afforded for the joint and an effective non-slipping grip obtained by the fastener, so that no possibility of the belt stretching at the joint will result.

The construction of fastener and its manner of use also provides for the belt edges projecting slightly beyond the ends of the fastener and thereby to ensure that when running through belt guides and the like there will be no possibility of the metal fastener engaging such guides with the consequent knocking action and liability of the fastening being strained.

The invention is illustrated in the accompanying drawings, in which:—

Figure 1 is a plan of the fastener and of the two belt ends to be connected thereby, as prepared for use with the fastener.

Figure 2 is a side elevation showing the fastener in use to connect the belt ends and the belt strained to working conditions.

Figure 3 is a sectional side elevation showing the fastener with the belt ends passing loosely into it, in the connecting of the two ends.

According to this invention, the belt fastener designed is formed from a single plate of metal A, either wrought or cast, of approved thickness and length and of a width just shorter than the width of the belt ends to be joined. This plate is made with a series of slots, formed by a central line of three closed slots B extending in parallel lines across the width of the plate, along the central portion of such width, and an outer line of three slots C on each side of the central line extending in from the side of the plate in respectively straight lines with the central slots. Thus three lines of slots are arranged also to extend in parallel across the width of the plate, one along the central line of the plate's length and the others, one near each of its ends. The central line of slots in the length of the plate are made of widths such as to be adapted to receive two thicknesses of the belt to be joined, while the end lines are made of widths such as to be capable of receiving one thickness of the belt. The slots C of the outer lines of slots open to the sides of the plate, as shown in Figure 1.

The belt ends D to be joined, each is cut inwards from its end with slots E that are made of approximate width to the width of the plate portions dividing the slots B from the slots C, and so positioned that three tongues are formed to extend continuously with the belt end. The central tongue F of these three is made of a width such as to correspond with the length of the slots B in the fastener plate, while the two outer tongues G are made respectively of widths slightly greater than the lengths of the outer slots C of the fastener.

The fastener is used in the following manner: The two belt ends are brought with their inside faces together so as to extend in parallel and the fastener is then passed down on to the tongues F and G so that such tongues pass up through the corresponding slots B and C of the middle line of slots. The tongues of the respective belt ends are then doubled down and out to the respective ends of the fastener and are passed in through the outer line of slots B—C at that end of the fastener and along beneath its end, in the manner clearly shown in Figure 3. Then when the belt is strained, the turns of the tongues are drawn closely in on to the plate and the extremities are gripped between the main portion of the belt and the plate ends so that a strong grip is afforded.

A belt may be taken up or let out at any time without cutting the belt, other than may be necessary to lengthen the slots in its ends when taking up.

The fastener, may if desired, be formed with two, or more series of slots B arranged in the three parallel lines across its width with the outer two series of slots C, the belt ends being cut with a corresponding number of tongues between the side tongues G.

I claim:—

1. A belt fastener formed by a flat plate of metal made with a series of three slots extending in from each of its side edges in parallel lines and with intermediate closed slots arranged in parallel lines across the plate's width and in respectively uniform lines with the three slots of the outer two series of slots, substantially as specified.

2. A belt fastener formed by a flat metal plate made with a line of wide slots extending along its middle line and consisting in intermediate closed slots and two end slots opening into the respective sides of the plate, and with two lines of narrow slots similarly positioned to the middle line, arranged respectively near each end of the plate, substantially as specified.

3. A belt fastener formed by a flat plate of metal made with a series of three slots extended from each of its side edges in parallel lines and with intermediate closed slots in parallel lines across the plate's width and in relatively uniform lines with the three slots of the outer two series of slots, the bars left in the plate being of substantially rectangular section.

4. A machinery belt fastener formed by a flat metal plate made with a line of wide slots extending along its middle line and consisting in intermediate closed slots and two end slots opening into the respective sides of the plate, and with two lines of narrow slots similarly positioned to the middle line, arranged respectively near each end of the plate being of substantially rectangular section.

In testimony whereof, I affix my signature.

THOMAS SHAW.

Witnesses:
    DAVID BROWN HUTTON,
    SAMUEL OLDFIELD.